United States Patent
Kitamura et al.

(10) Patent No.: US 7,034,775 B2
(45) Date of Patent: Apr. 25, 2006

(54) DISPLAY DEVICE AND METHOD FOR MANUFACTURING THE SAME

(75) Inventors: Shojiro Kitamura, Nagano-ken (JP); Tsugio Ide, Nagano-ken (JP); Atsushi Harada, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 555 days.

(21) Appl. No.: 10/096,947

(22) Filed: Mar. 14, 2002

(65) Prior Publication Data
US 2002/0135543 A1    Sep. 26, 2002

(30) Foreign Application Priority Data
Mar. 26, 2001    (JP)    ............................. 2001-088823

(51) Int. Cl.
  *G09G 5/00*    (2006.01)
(52) U.S. Cl. ........................ 345/2.1; 345/55; 385/49
(58) Field of Classification Search ........ 345/204–206, 345/55–111, 2.1; 315/149, 155, 169.3–169.4; 385/49; 257/433
See application file for complete search history.

(56) References Cited

U.S. PATENT DOCUMENTS

| | | | | |
|---|---|---|---|---|
| 3,761,768 A | * | 9/1973 | Schmersal | .................... 345/71 |
| 5,105,183 A | * | 4/1992 | Beckman | .................... 345/1.3 |
| 5,612,710 A | * | 3/1997 | Christensen et al. | .......... 345/30 |
| 5,657,056 A | * | 8/1997 | Izumi et al. | ................. 345/205 |
| 5,835,646 A | * | 11/1998 | Yoshimura et al. | ........... 385/14 |
| 6,147,667 A | * | 11/2000 | Yamazaki et al. | ............ 345/92 |
| 6,150,188 A | * | 11/2000 | Geusic et al. | ................. 438/31 |
| 6,297,787 B1 | * | 10/2001 | Nishida | ....................... 345/1.3 |
| 6,343,164 B1 | * | 1/2002 | Robertsson et al. | .......... 385/14 |
| 6,477,286 B1 | * | 11/2002 | Ouchi | ......................... 385/14 |

FOREIGN PATENT DOCUMENTS

| | | |
|---|---|---|
| JP | A-10-125929 | 5/1998 |
| JP | A-10-125930 | 5/1998 |
| JP | A-10-125931 | 5/1998 |

* cited by examiner

*Primary Examiner*—Amr A. Awad
(74) *Attorney, Agent, or Firm*—Oliff & Berridge, PLC

(57) ABSTRACT

The invention provides a display device whose size and resolution can easily be increased. Signal transmission lines, from signal control circuits to data electrode driving circuits, are optical waveguides serving as optical transmission lines capable of transmitting optical signals. Signal transmission lines, from the signal control circuits to address electrode driving circuits, are also optical waveguides serving as optical transmission lines capable of transmitting optical signals.

5 Claims, 7 Drawing Sheets

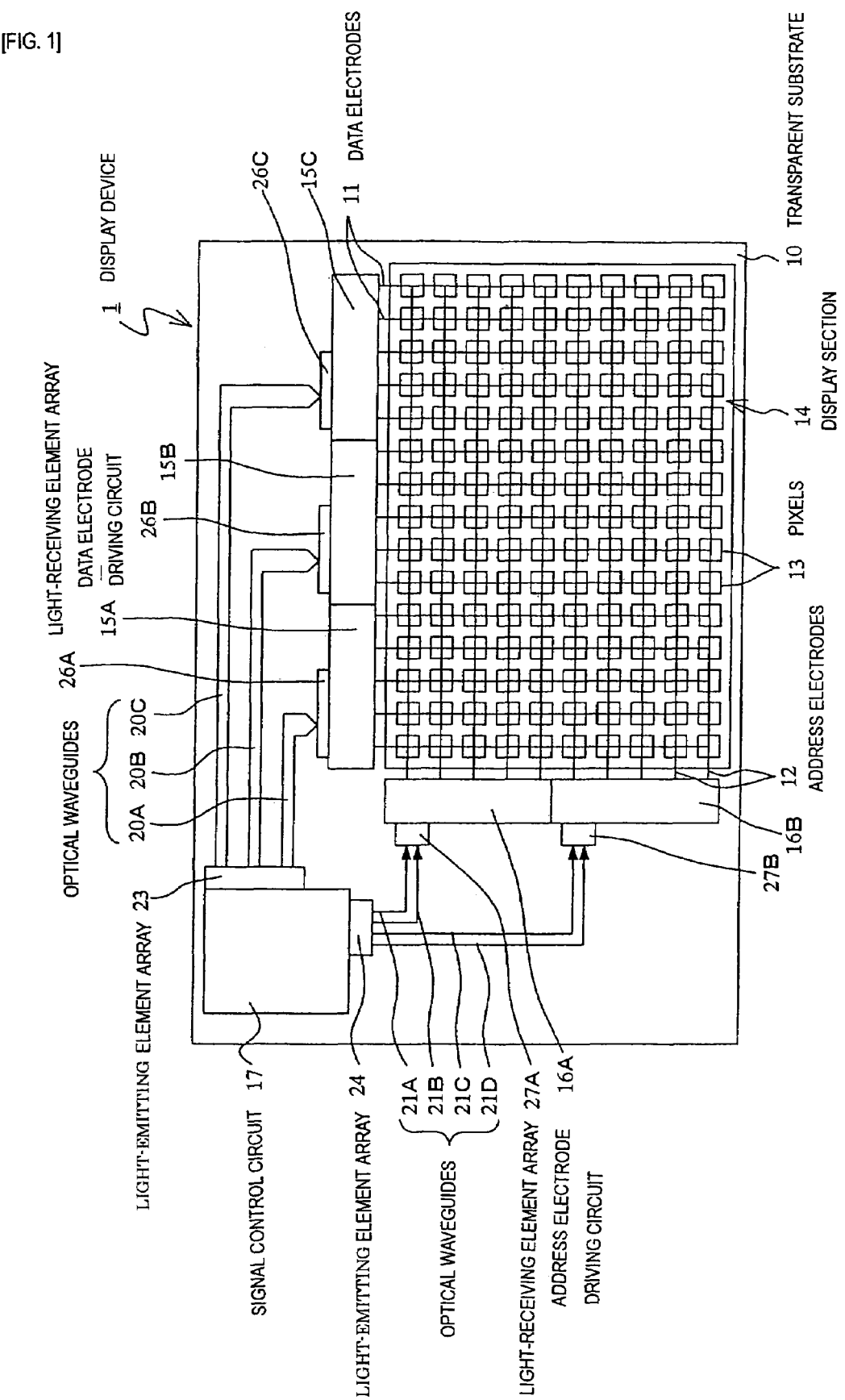
[FIG. 1]

[FIG. 2]
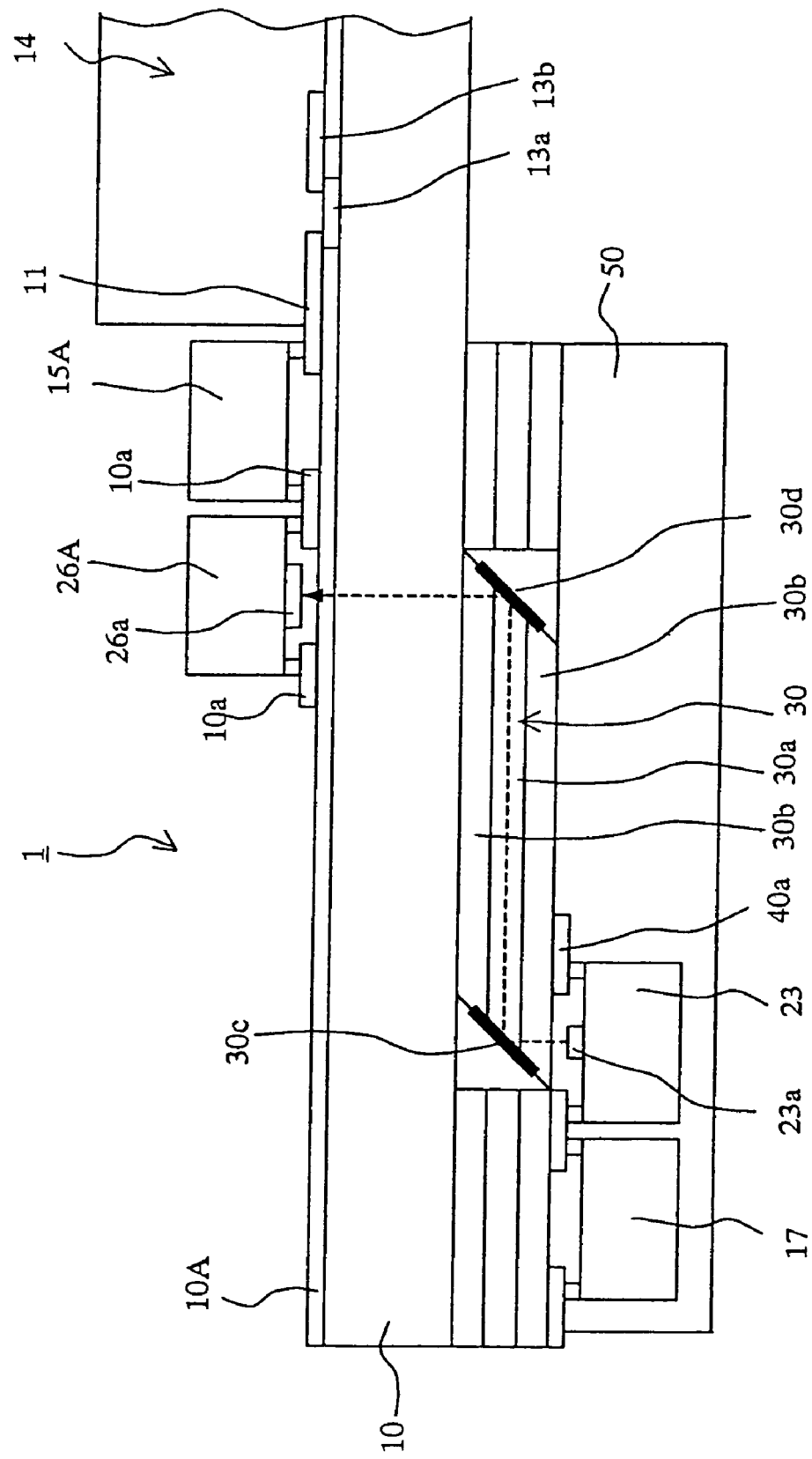

[FIG. 3]
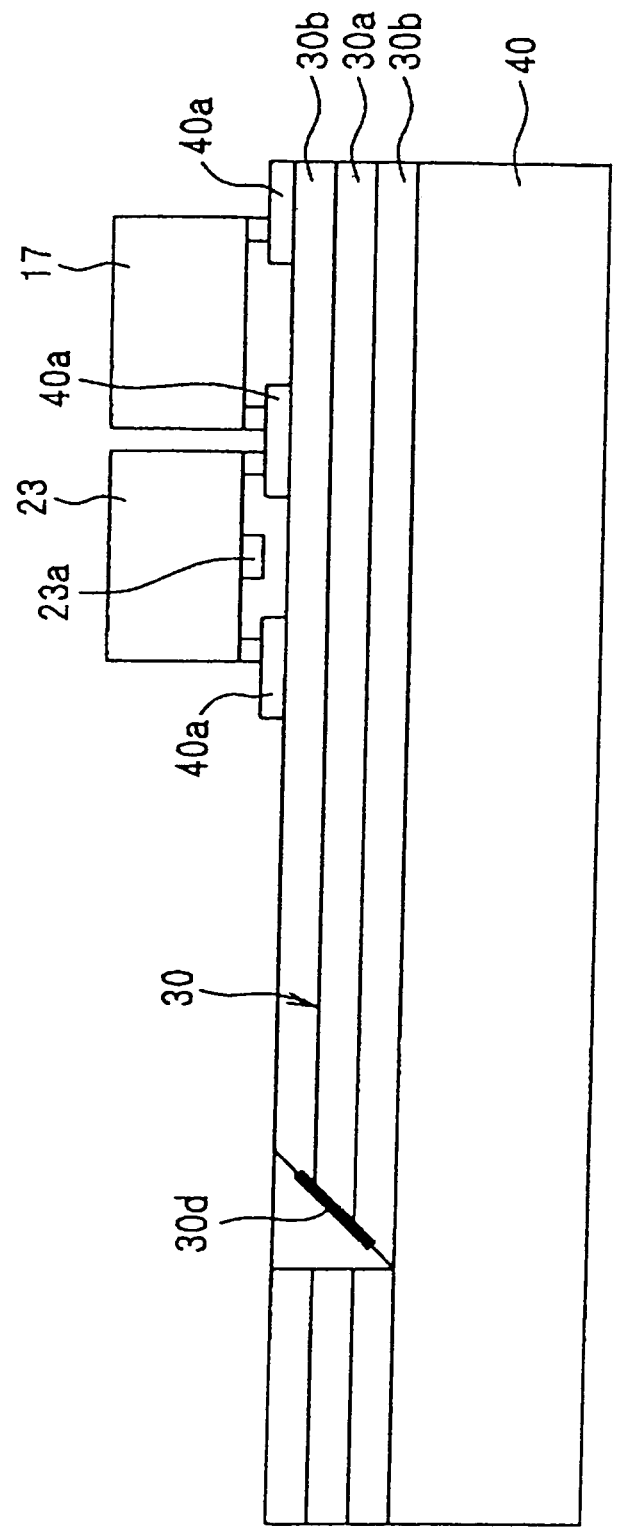

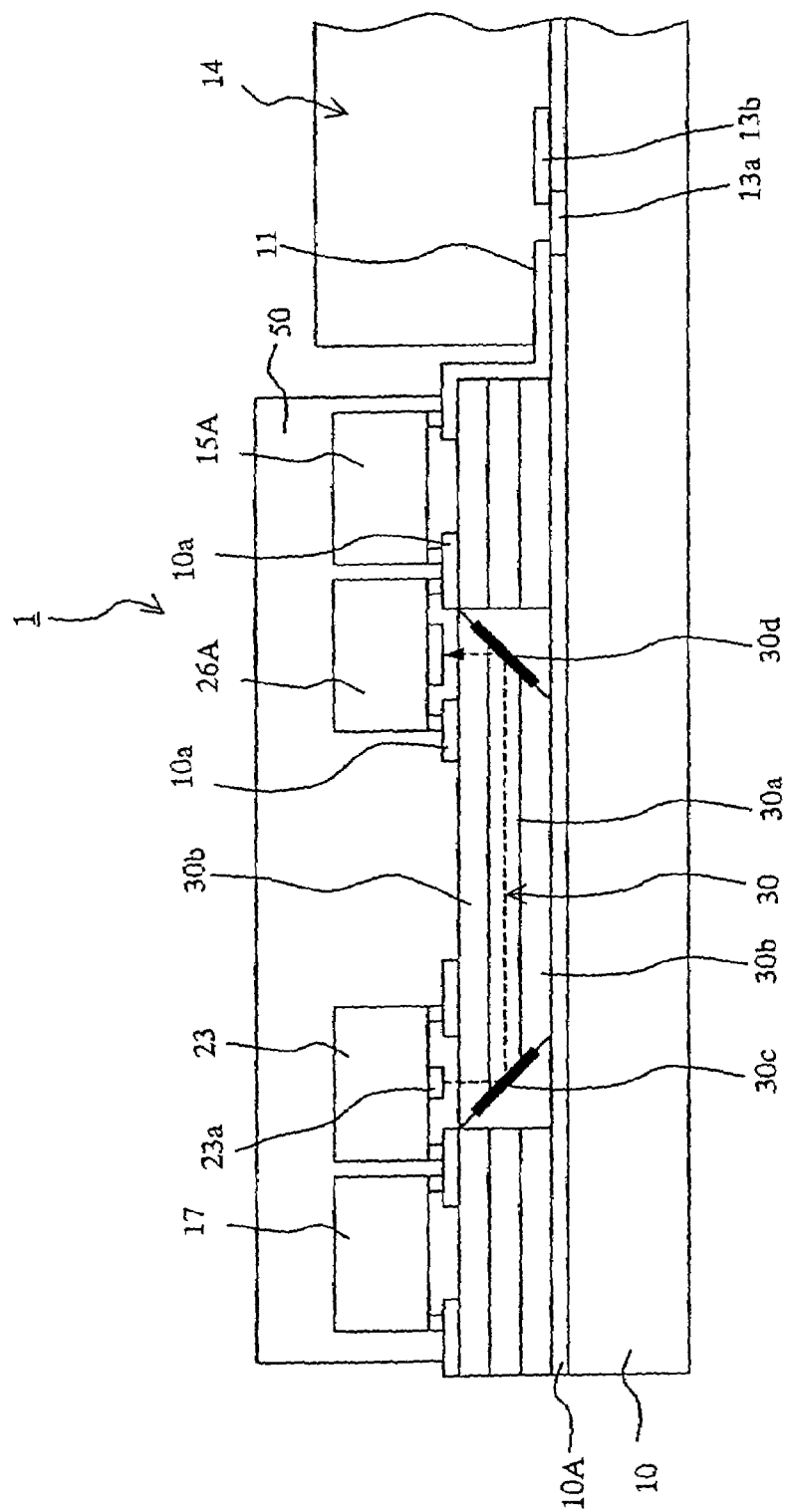
[FIG. 4]

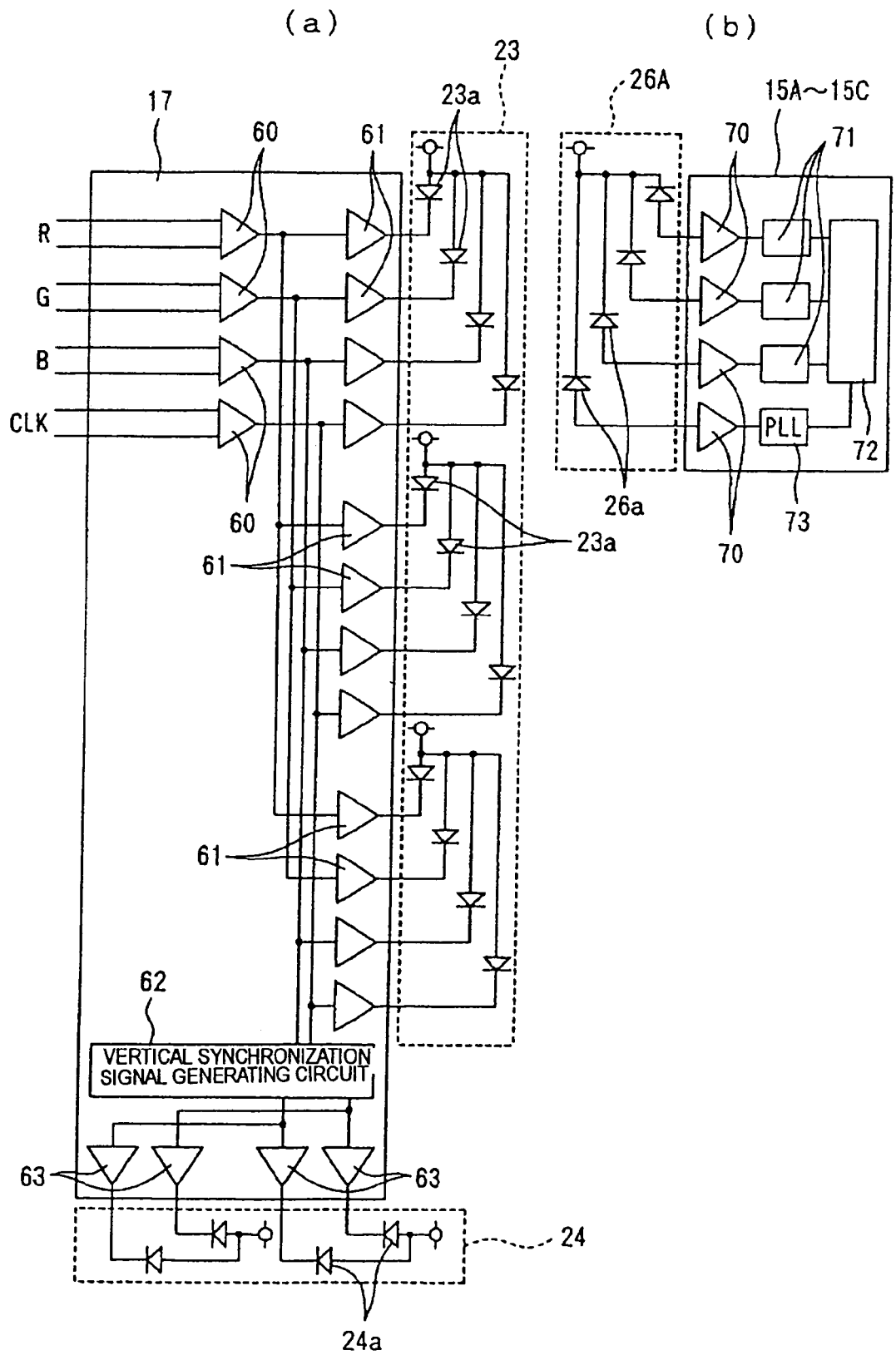
[FIG. 5]

[FIG. 6]
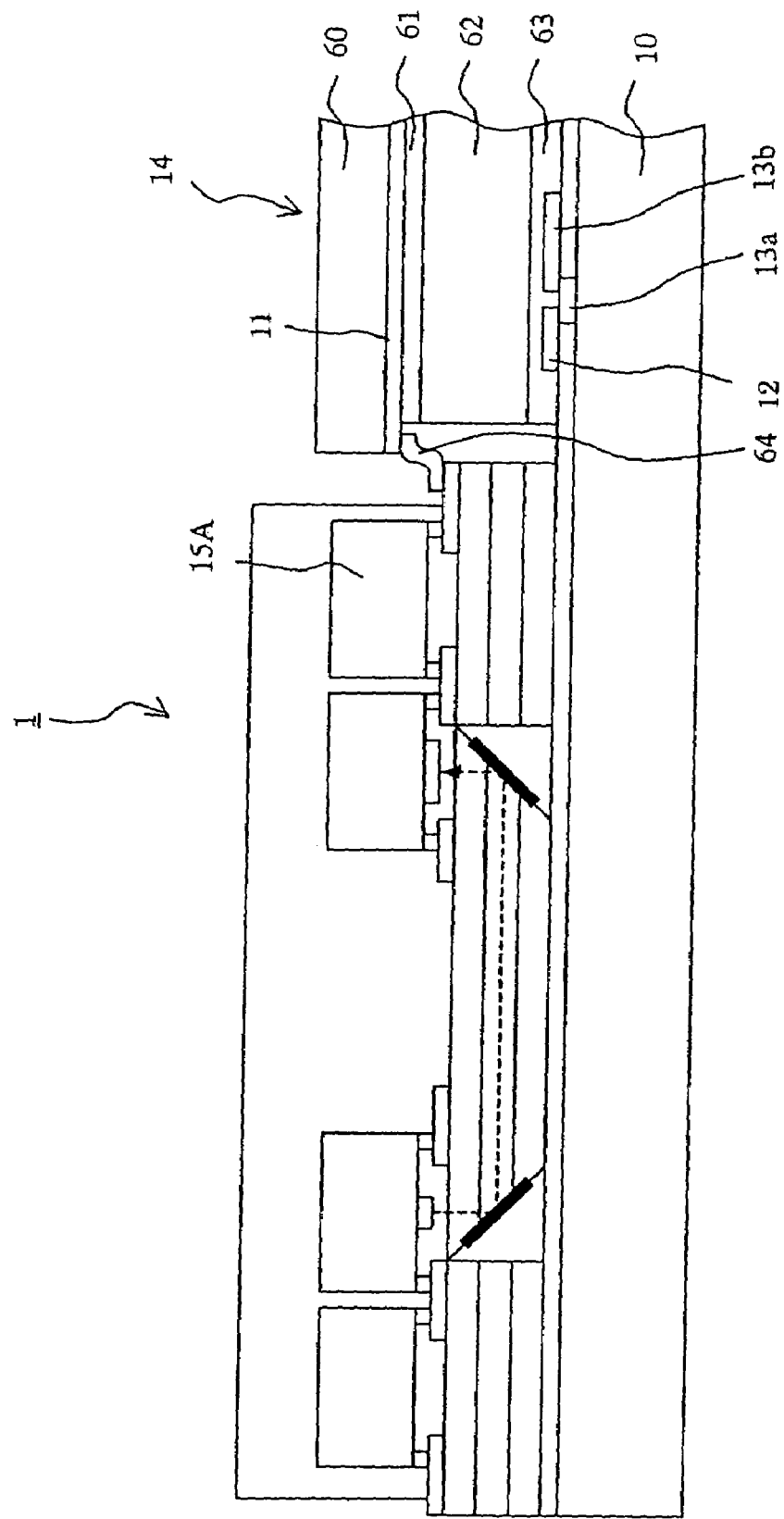

[FIG. 7]
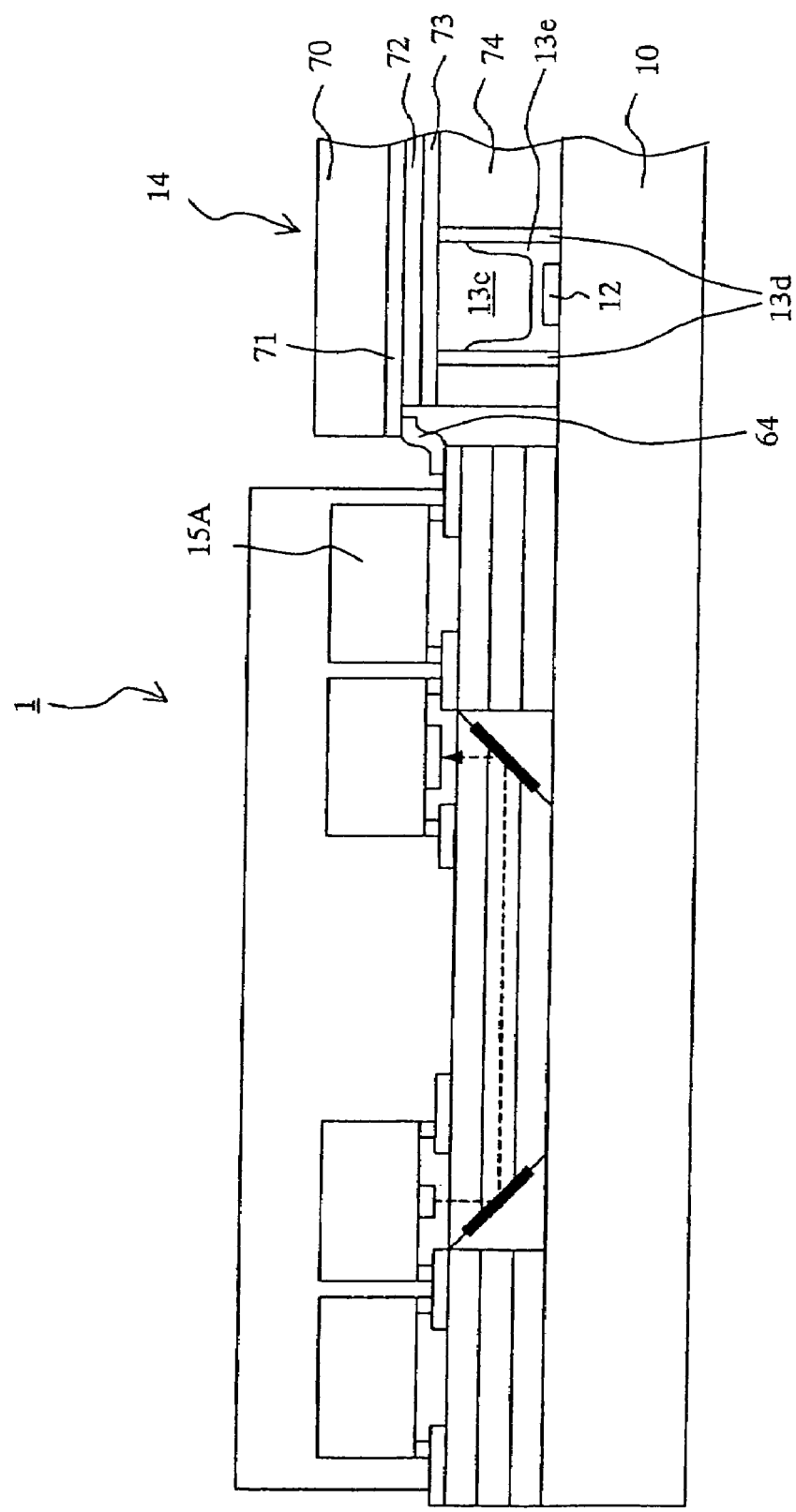

DISPLAY DEVICE AND METHOD FOR MANUFACTURING THE SAME

BACKGROUND OF THE INVENTION

1. Field of Invention

The present invention relates to display devices, such as liquid as crystal display devices and organic EL (electroluminescence) display devices, and methods for manufacturing the display devices. In particular, the present invention relates to a display device whose size and resolution can easily be increased.

2. Description of Related Art

In, for example, a conventional liquid crystal display device (LCD), signal control circuits for creating image signals, clock signals, and synchronization signals (vertical synchronization signals, horizontal synchronization signals), data electrode driving circuits, and address electrode driving circuits are connected through a bus that includes electrical wiring. For example, if RGB (red, green, and blue) each have a gradation of 256 steps (8 bits), the number of bits of the data bus for transmitting image signals is 24 (=8×3).

In order to increase the size or the resolution of a display device, in some cases, data electrodes and address electrodes of the display section are divided into a plurality of blocks so that data is written and scanned at a practicable interval to serve as a display device. Each block has data electrode driving circuits or address electrode driving circuits, and the signal control circuits input signals into the data electrode driving circuits and the address electrode driving circuits in parallel.

SUMMARY OF THE INVENTION

On the other hand, as the size and the resolution of the display device are being increased, the operating frequency is also increased, and the bus connecting the signal control circuits to the data electrode driving circuits and the address electrode driving circuits needs to be longer. As a result, EMI (electromagnetic interference) and skew between a plurality of ICs including the data electrode driving circuits and the address electrode driving circuits are liable to occur. Such a problem is not completely solved by dividing the data electrode driving circuits and the address electrodes driving circuits into a plurality of blocks as described above.

Accordingly, the invention addresses the above problem, and provides display device whose size and resolution can easily be increased. The invention also provides a method for manufacturing the display device.

A display device according to the present invention includes a display section that includes pixels arrayed at respective intersections of data electrodes and address electrodes, which are disposed in a grid; data electrode driving circuits that drive the data electrodes; address electrode driving circuits that drive the address electrodes; signal control circuits that generate signals necessary to drive the data electrode driving circuits and the address electrode driving circuits and that supply the signals to the data electrode driving circuits and the address electrode driving circuits; and signal transmission lines that transmit signals between the signal control circuits and the data electrode driving circuits, and between the signal control circuits and the address electrode driving circuits. The signal transmission lines are optical transmission lines capable of transmitting optical signals. Light-emitting elements that convert electrical signals into optical signals are provided between the signal control circuits and the signal transmission lines. Light-receiving elements that convert the optical signals into electrical signals are provided between the signal transmission lines and the data electrode driving circuits, and between the signal transmission lines and the address electrode driving circuits.

Exemplary embodiments are described below.

The display section, the data electrode driving circuits, the address electrode driving circuits, the signal control circuits, the signal transmission lines, the light-emitting elements, and the light-receiving elements are disposed on a single substrate.

Also, the display section, the data electrode driving circuits, the address electrode driving circuits, and the light-receiving elements are disposed on one surface of a transparent substrate, and the signal control circuits, the signal transmission lines, and the light-emitting elements are disposed on the other surface of the transparent substrate. Optical signals transmitted through the signal transmission lines pass through the transparent substrate from one surface to the other surface thereof, and thus enter the light-receiving elements.

Meanwhile, a method for manufacturing the display device includes the steps of: providing a display section that includes pixels arrayed at respective intersections of data electrodes and address electrodes disposed in a grid on one surface of a transparent first substrate; forming polymer optical waveguides on a second substrate; disposing on the polymer optical waveguides data electrode driving circuits that drive the data electrodes, address electrode driving circuits that drive the address electrodes, a light-receiving element having a signal-output sides connected to the signal-input sides of the data electrode driving circuits, a light-receiving element having a signal-output sides connected to the signal-input sides of the address electrode driving circuits, signal control circuits that generate and output signals necessary to drive the data electrode driving circuits and the address electrode driving circuits, and light-emitting elements that convert electrical signals generated by the signal control circuits into optical signals and transmit the signals to the polymer optical waveguides; bonding a third substrate to the second substrate such that the polymer optical waveguides are located therebetween, and then removing the second substrate from the polymer optical waveguides; forming, in each polymer optical waveguide, a mirror that sends light emitted by the corresponding light-emitting element to the polymer optical waveguide and a mirror that sends the light to the corresponding light-receiving element; and bonding the third substrate to the other surface of the first substrate such that the polymer optical waveguides are located therebetween.

A method for manufacturing the display device includes the steps of: providing, on one surface of a transparent first substrate, a display section that includes pixels arrayed at respective intersections of data electrodes and address electrodes disposed in a grid, data electrode driving circuits that drive the data electrodes, address electrode driving circuits that drive the address electrodes, a light-receiving element having signal-output sides connected to the signal-input sides of the data electrode driving circuits, and a light-receiving element having a signal-output sides connected to the signal-input sides of the address electrode driving circuits; forming polymer optical waveguides on a second substrate; forming, in each polymer optical waveguide, a mirror that sends light to the corresponding light-receiving element; disposing signal control circuits that generate and output signals necessary to drive the data electrode driving circuits and the address electrode driving circuits, light-emitting elements that convert electrical signals generated by the signal control circuits into optical signals and transmit the optical signals to the polymer optical waveguides; subsequently, bonding a third substrate to the second substrate such that the polymer optical waveguides are located therebetween; and then, removing the second substrate from the polymer optical waveguides; forming mirrors that send light emitted by the light-emitting elements to the respective polymer optical waveguides; and bonding the third substrate to the other surface of the first substrate such that the polymer optical waveguides are located therebetween.

The signal transmission lines are optical transmission lines and both sides of the lines are each provided with a light-emitting element and a light-receiving element. Signals generated by the signal control circuits according to a data signal from the outsides of the display device are converted into optical signals by the light-emitting element, are transmitted to the signal transmission lines, and are converted into electrical signals by the light-receiving elements, and thus, transmitted to the data electrode driving circuits and the address electrode driving circuits. As a result, EMI in the case of having signals transmitted between the signal control circuits and the data electrode driving circuits, and between the signal control circuits and the address electrode driving circuits, and skew between ICs comprising a plurality of data electrode driving circuits and a plurality of address electrode driving circuits do not occur.

Also, since the display section, the signal transmission lines, and others are disposed on a single substrate, and more concretely, the transmission lines are provided in the periphery of the area that forms the display section, the display device is, in appearance, the same as conventional display devices that include electrical signal transmission lines.

In particular, by disposing the parts downstream from the light-receiving elements on one surface of a transparent substrate, disposing the parts upstream from the signal transmission lines on the other surface of the transparent substrate so that lights are transmitted in the thickness direction of the transparent substrate between the signal transmission lines and the light-receiving elements, both surfaces of the transparent substrate can be effectively utilized.

By using second and third substrates in addition to the transparent first substrate to manufacture the display device, it is relatively simple to manufacture the display device. Techniques disclosed in Japanese Unexamined Patent Application Publication Nos. 10-125929, 10-125930, and 10-125931, which were proposed by the Applicant of the present invention, can be used to remove the second substrate, for example.

The timing and the method of disposing the display section on one surface of the first substrate are arbitrary. The display section may be disposed before or after bonding the third substrate.

Also, the timing and the method of disposing the display section, the data electrode driving circuits, the address electrode driving circuits, and the light-receiving elements on one surface of the first substrate are arbitrary. The order in which these parts are disposed is also arbitrary. All of these parts may be disposed on the surface of the first substrate before bonding the third substrate. Alternatively, some of the parts may be disposed on the surface of the first substrate before bonding the third substrate, and the others may be disposed after bonding the third substrate.

Embodiments of the present invention will now be described with reference to drawings.

BRIEF DESCRIPTION OF THE DRAWINGS

FIG. 1 is a plan view showing the structure of a display device according to a first embodiment;

FIG. 2 is a sectional view of a principal part of the display device according to the first embodiment;

FIG. 3 is a sectional view showing a method for manufacturing the display device according to the first embodiment;

FIG. 4 is a sectional view of a principal part of a display device according to a second embodiment;

FIGS. 5(a) and 5(b) are circuit diagrams according to a fifth embodiment;

FIG. 6 is a sectional view showing a principal part of a display device according to a third embodiment;

FIG. 7 is a sectional view showing a principal part of a display device according to a fourth embodiment.

DETAILED DESCRIPTION OF PREFERRED EMBODIMENTS

Embodiments of the present invention are described below, with reference to drawings.

FIGS. 1 to 3 show a first embodiment of the present invention. FIG. 1 is a plan view showing the overall structure of a display device 1, and FIG. 2 is a sectional view of a principal part of the display device 1.

Specifically, the display device 1 is used for, for example, a display of a personal computer, and preferably serves as a thin film transistor liquid crystal display device and an organic EL (electroluminescence) display device.

A plurality of data electrodes 11 extending in the longitudinal direction, and a plurality of address electrodes 12 extending in the transverse direction, are disposed in a grid on a transparent substrate 10. A display section 14 is formed in which pixels 13 are arrayed at respective intersections of the data electrodes 11 and the address electrodes 12. The structure of the pixels 13 are not specifically shown in the drawings, and have the same structure as in known liquid crystal display devices or organic EL display devices.

The data electrodes 11 are divided into a plurality of blocks (three in this embodiment) which are each connected to one of data electrode driving circuits 15A, 15B, and 15C. The address electrodes 12 are divided into a plurality of blocks (two in this embodiment) which are each connected to one of address electrode driving circuits 16A and 16B.

The data electrode driving circuits 15A to 15C control potentials of the data electrodes 11 connected thereto, and the address electrode driving circuits 16A and 16B drive the address electrodes 12 connected thereto to control the connection between the data electrodes 11 and pixel electrodes 13b. Specifically, when an address electrode 12 is driven by the address electrode driving circuits 16A or 16B, pixel electrodes 13b and data electrodes 11 connected to the excited address electrode 12 are electrically connected with each other, and thus data corresponding to the potentials of the data electrodes 11 are written in the respective pixels 13.

The signal control circuits 17 supply necessary data to the data electrode driving circuits 15A to 15C and the address electrode driving circuits 16A and 16B.

The signal control circuits 17 receive a data signal, a horizontal synchronization signal, a vertical synchronization signal, and a clock signal from an external host device (for example, a personal computer). The clock signal, horizontal synchronization signal, and data signal are each divided into the number of the data electrode driving circuits 15A to 15C. The clock signal and vertical synchronization signal are divided into the number of the address electrode driving circuits 16A and 16B. These divided signals are supplied to the data electrode driving circuits 15A to 15C and the address electrode driving circuits 16A and 16B.

In this embodiment, optical waveguides 20A, 20B, and 20C serve as optical transmission lines, which are capable of transmitting optical signals, to transmit the above-described signals from the signal control circuits 17 to the data electrode driving circuits 15A to 15C; and optical waveguides 21A, 21B, 21C, and 21D serve as optical transmission lines, which are capable of transmitting optical signals, to transmit the above-described signals from the signal control circuits 17 to the address electrode driving circuits 16A and 16B.

The optical waveguides 20A to 20C between the signal control circuits 17 and the data electrode driving circuits 15A to 15C are each shown as elongated extensions, and in practice they are each multi-bit lines. When, for example, three colors (R, G, and B) are each represented by 8 bits, the data signals are 24 bits (3 colors×8 bits), the clock signal is 1 bit, and the horizontal synchronization signal is 1 bit. Hence, the optical waveguides 20A to 20C are multi-bit lines capable of transmitting 26-bit signals in parallel, respectively.

In contrast, the optical waveguides 21A to 21D, between the signal control circuits 17 and the address electrode driving circuits 16A and 16B, are 1-bit lines, respectively. Optical waveguides 21A and 21C transmit the clock signal, and the optical waveguides 21B and 21D transmit a vertical synchronization signal.

A light-emitting element array 23, including a plurality of (for example, 78 (=26 bits×3 blocks)) surface emitting lasers (VCSELs) serving as light-emitting elements, is provided between the signal control circuit 17 and optical waveguides 20A to 20C, and also a light-emitting element array 24, including a plurality of (for example, 4 (=2 bits×2 blocks)) surface emitting lasers serving as light-emitting elements, is provided between the signal control circuits 17 and the optical waveguides 21A to 21D. In addition, the above-described circuits that divide signals, the signal control circuits 17 include a driver for light-emitting elements that drives the surface emitting lasers contained in the light-emitting element array 23, and drivers for light-emitting elements that drives the surface emitting lasers contained in the light-emitting element array 24.

On the other hand, light-receiving element arrays 26A, 26B, and 26C, including a plurality of photodiodes (for example, 26 (=24 bits+1 bit+1 bit)) serving as light-receiving elements, are provided between the optical waveguides 20A to 20C and the data electrode driving circuits 15A to 15C, and also light-receiving element arrays 27A and 27B, including a plurality of photodiodes (for example, 2 (=1 bit+1 bit)) serving as light-receiving elements, are provided between the optical waveguides 21A to 21D and the address electrode driving circuits 16A and 16B. The data electrode driving circuits 15A to 15C include amplifiers that convert into a voltage a signal photoelectrically converted by photodiodes in the light-receiving element arrays 26A to 26C. The address electrode driving circuits 16A and 16B include amplifiers that convert into a voltage a signal photoelectrically converted by photodiodes in the light-receiving element arrays 27A and 27B.

The parts of the display device 1 are arranged as described above in plan view. As shown in FIG. 2, however, these parts are disposed on both surfaces of the transparent substrate 10. FIG. 2 shows a fragmentary structure of the display device 1.

Specifically, the display section 14, the data electrode driving circuits 15A to 15C (FIG. 2 only shows the data electrode dividing circuit 15A), the address electrode driving circuits 16A and 16B (not shown in FIG. 2), the light-receiving element arrays 26A to 26C (FIG. 2 only shows a light-receiving element array 26A), and the light-receiving element arrays 27A and 27B (not shown in FIG. 2) are disposed on one surface of the transparent substrate 10. Also, a TFT (thin film transistor) layer 10A that forms transistor circuits 13a included in the pixels 13 is formed on the surface of the transparent substrate 10.

On the other hand, the signal control circuits 17, the light-emitting element array 23, the light-emitting element array 24 (not shown in FIG. 2), and optical waveguides 20A to 20C and 21A to 21D (FIG. 2 only shows 1-bit optical waveguide 30 included in the optical waveguide 20A) are disposed on the other surface of the transparent substrate 10. The optical waveguide 30 is a polymer optical waveguide in which both surfaces in the thickness direction, and both sides in the width direction of a core 30a, are coated with cladding 30b.

A mirror 30c is provided on the upstream sides of the optical waveguide 30 in the optical wave direction. The mirror 30c deflects by 90° the direction of light entering, in the thickness direction of the transparent substrate 10, from a light-emitting element 23a included in the light-emitting element array 23, and thus the light is transmitted through the core 30a along a surface of the transparent substrate 10.

A mirror 30d is provided on the downstream side of the optical waveguide 30 in the optical wave direction. The mirror 30d deflects by 90° the direction of the light transmitted through the core 30a, so that the light passes through the transparent substrate 10 from the under surface towards the upper surface thereof.

The light-receiving surface of a light-receiving element 26a included in the light-receiving element array 26A opposes the transparent substrate 10, and is located so as to overlie the position where the mirror 30d is disposed. Thus, the light reflected at the mirror 30d and transmitted from the under surface to the upper surface of the transparent substrate 10 reaches the light-receiving surface of the light-receiving element 26a.

A method for manufacturing the display device 1 according to this embodiment will now be described.

Transistor circuits 13a of the pixels 13 are formed on the transparent substrate 10 by using the TFT layer 10A formed on the transparent substrate 10. Then, necessary electrical wires (data electrodes 11, address electrodes 12, and other electrical wires 10a) are provided. Materials of the wires may depend on use. For example, transparent electrodes are used for the wires overlapping with the pixels 13, and aluminum or gold wire is used for other parts.

Next, the data electrode driving circuits 15A to 15C, the address electrode driving circuits 16A and 16B, the light-receiving element arrays 26A to 26C, and the light-receiving element arrays 27A and 27B are disposed on the transparent substrate 10 by flip-chip bonding.

Meanwhile, a second substrate 40, which is different from the transparent substrate 10, is prepared, and polymer optical waveguides, including the waveguide 30 that includes the core 30a coated with the cladding layer 30b, are formed on the second substrate 40 by known photolithography, according to the pattern of the optical waveguides 20A to 20C and 21A to 21D. Next, mirrors 30d, whose normals are inclined in a 45° direction, are formed in the areas corresponding to each light-receiving element included in the light-receiving element arrays 26A to 26C and 27A and 27B by etching or the like. The mirror 30*d* in the drawing is formed in a planar shape, but may be formed as a lens or as a diffraction grating to efficiently transmit an optical signal to the corresponding light-receiving element from the optical waveguide 30.

After necessary electrical wires 40*a* are formed, the signal control circuits 17, the light-emitting element array 23, and the light-emitting element array 24 (not shown in FIG. 3) are disposed by flip-chip bonding.

Another substrate, that is, a third substrate 50 is bonded to the upper surface of the second substrate 40 so that the optical waveguide 30 is located therebetween. The third substrate 50 is not shown in FIG. 3, but is shown in FIG. 2 in which the structure is inverted. The thicknesses of the signal control circuits 17 and the light-emitting element array 23 are only drawn at a larger scale than those of the second substrate 40 and the third substrate 50 for the sake of convenience of description and illustration, and the third substrate 50 may need to be deeply processed. However, such a process is not necessary in practice.

After the third substrate 50 is bonded, the second substrate 40 is removed. The techniques disclosed in the above-described Japanese Unexamined Patent Application Publications can be used to remove the second substrate 40, for example. Described briefly, a separation layer formed of a light-absorption layer formed of amorphous silicon, and a reflection layer formed of a metal thin film is formed such that the light-absorption layer opposes the second substrate 40 before the cladding layer 30*b* is formed above the surface of the second substrate 40, which is a transparent substrate, as shown in FIG. 3. The cladding layer 30*b* and the core 30*a* are formed on the separation layer, or on an interlayer formed on the separation layer. After the third substrate 50 is bonded, exposure light, such as a laser beam, is radiated towards the separation layer through the under surface of the second substrate 40 to cause ablation in the light-absorption layer, and thus cause separation in the separation layer and at the interface with the second substrate 40. Thus, the second substrate 40 is removed.

After the second substrate 40 is removed, the reflection layer is removed by etching or the like. The areas corresponding to each light-emitting element included in the light-emitting element arrays 23 and 24 are subjected to etching or the like from the surface from which the second substrate 40 was removed, and mirrors 30*c* whose normals are inclined in the 45° direction are formed. The mirror 30*c* in the drawing is formed in a planar shape, but may be formed as a lens, or as a diffraction grating so that optical signals efficiently enter the optical waveguide 30.

Then, the third substrate 50 is bonded to the under surface of the transparent substrate 10 such that optical waveguides including the optical waveguide 30 are located therebetween. According to the type of the display device 1, a liquid crystal or an organic EL layer is disposed to form the display section 14. Thus, the display device 1 is completed.

In the display device 1 having the structure described above, when a data signal, a horizontal synchronization signal, a vertical synchronization signal, and a clock signal are supplied to the signal control circuits 17 from an external host device, the signal control circuits 17 divide the clock signal, the horizontal synchronization signal, and the data signal into the number of the data electrode driving circuits 15A to 15C, and divide the clock signal and the vertical synchronization signal into the number of the address electrode driving circuits 16A and 16B. These divided signals are converted into optical signals in the light-emitting element array 23 or 24. Subsequently, the signals are supplied to the data electrode driving circuits 15A to 15C through the optical waveguides 20A to 20C and the light-receiving element arrays 26A to 26C, or are supplied to the address electrode driving circuits 16A and 16B through the optical waveguides 21A to 21D and the light-receiving element arrays 27A and 27B.

After the signals are supplied to the data electrode driving circuits 15A to 15C and the address electrode driving circuits 16A and 16B, each address electrode 12 is excited one-by-one to be driven. Data is supplied to each data electrode 15 in turn to be written to the pixels 13 while the address electrodes 12 are driven in a cycle. According to the written data, the pixels 13 emit light or the like, and thus images and characters are displayed on the display section 14 of the display device 1.

Since, in this embodiment, the signal transmission lines between the signal control circuits 17 and the data electrode driving circuits 15A to 15C, and between the signal control circuits 17 and the address electrode driving circuits 16A and 16B, are the optical waveguides 20A to 20C and 21A to 21D, EMI, skew between the data electrode driving circuits 15A to 15C, and skew between the address electrode driving circuits 16A and 16B, do not occur. The display device 1 having the structure according to this embodiment is, therefore, extremely advantageous to increase the size and the resolution thereof.

Also, since parts of the display device are disposed using both under and upper surfaces of the transparent substrate 10 in the embodiment, both surfaces of the transparent substrate 10 are effectively utilized.

FIG. 4 shows a second embodiment of the present invention and is a sectional view of the principal part of a display device 1. This embodiment, as in the first embodiment, is applied to TFT liquid crystal display devices and organic EL display devices. Since the planar arrangement of parts of the display device 1 is the same as in the first embodiment shown in FIG. 1, the same description is not repeated. The same parts as in the first embodiment are designated by the same numerals and the description is not repeated.

This embodiment is different from the first embodiment in that only one surface of the transparent substrate 10 is used to dispose the parts of the display device 1. The method for manufacturing the display device 1 is the same as in the first embodiment in that the second substrate 40 (not shown in the drawing) and the third substrate 50 are used, and is different in that the data electrode driving circuits 15A to 15C, the address electrode driving circuits 16A to 16C, and the light-receiving element arrays 26A to 26C and 27A and 27B are disposed by flip-chip bonding when the parts are disposed on the second substrate 40, as shown in FIG. 3, and in that both mirrors 30*c* and 30*d* are formed after the second substrate 40 is removed following bonding of the third substrate 50.

In this embodiment, as in the first embodiment, since the signal transmission lines between the signal control circuits 17 and the data electrode driving circuits 15A to 15C, and between the signal control circuits 17 and the address electrode driving circuits 16A and 16B, are the optical waveguides 20A to 20C and 21A to 21D, EMI, skew between the data electrode driving circuits 15A to 15C, and skew between the address electrode driving circuits 16A and 16B, do not occur. The display device 1 is, therefore, extremely advantageous to increase the size and the resolution thereof.

FIG. 6 shows a third embodiment of the present invention and is a sectional view of the principal part of a display device 1. In this embodiment, the display section 14 is a TFD (thin film diode) liquid crystal display device. Since the planar arrangement of parts of the display device 1 is the same as in the first embodiment shown in FIG. 1, the same description is not repeated. The same parts as in the first embodiment and the second embodiment are designated by the same numerals and the description is not repeated.

In the display section 14 shown in FIG. 6, a transparent substrate 60 opposes the substrate 10 at a predetermined distance, and a liquid crystal unit 62 (not described in detail) is formed therebetween. The transparent substrate 60 has a color filter (not shown), data electrodes 11, and a protective layer 61. The substrate 10 has TFD (thin film diode) elements 13a included in the pixels 13, pixel electrodes 13b, address electrodes 12, and a protective layer 63.

This embodiment is different from the second embodiment in that the data electrodes 11 are connected to the data electrode driving circuits 15A with a ribbon cable 64, because the data electrodes 11 are not formed on the substrate 10 and instead are formed on another transparent substrate 60.

Although FIG. 6 does not show the connection of the address electrodes 12 with the address electrode driving circuits 16, it is the same as in the second embodiment and the description is not repeated.

The data electrode driving circuits 15A to 15C control potentials of the data electrodes 11 connected thereto with the ribbon cables 64, and the address electrode driving circuits 16A and 16B drive the TFD elements 13a connected thereto with the address electrodes 12. Specifically, when a TFD element 13a connected with an address electrode 12 is driven by the address electrode driving circuits 16A or 16B, the pixel electrode 13b and the data electrode 11 connected to the TFD element 13a are electrically connected to each other. Thus, the liquid crystal of the pixel 13 is switched into a display state, a non-display state, or an intermediate state according to the potential of the data electrode 11.

FIG. 7 shows a fourth embodiment of the present invention and is a sectional view of the principal part of the display device 1. In this embodiment, the display section 14 is a plasma display. Since the planar arrangement of parts of the display device 1 is the same as in the first embodiment shown in FIG. 1, the same description is not repeated. The same parts as in the first to third embodiments are designated by the same numerals and the description is not repeated.

In FIG. 7, the display section 14 includes a transparent substrate 70 and the substrate 10 opposing each other, and a discharge unit 72 between the transparent substrate 70 and the substrate 10. The transparent substrate 70 has display electrodes 71, a dielectric layer 72, and a protective layer 73, and the substrate 10 has address electrodes 78. In the discharge unit 74, partitions 13d are formed to define discharge chambers 13c filled with a rare gas, and a fluorescent phosphor 13e is formed inside of the discharging chambers 13c.

In this embodiment, as in the third embodiment, since the display electrodes 71 are disposed on the transparent substrate 70, the display electrodes 71 are connected to the display electrode driving circuits (data electrode driving circuits in FIG. 1) 15A with the ribbon cable 64.

Although FIG. 7 does not show the connection of the address electrodes 12 with the address electrode driving circuits 16, the connection is the same as in the second embodiment and the description is not repeated.

A voltage is applied to the address electrodes 12 and the display electrodes 71, thereby causing discharge (surface discharge) in the discharging chambers 13c to generate ultraviolet light. The fluorescent phosphor 13e is exposed to this ultraviolet light, and thus the pixels 13 emit light.

FIGS. 5(a) and 5(b) show a fifth embodiment of the present invention. FIG. 5(a) is a circuit diagram showing the interior structure of the signal control circuits 17, and FIG. 5(b) is a circuit diagram showing the interior structure of the data electrode driving circuits 15A to 15C. The other parts are the same as in the first and second embodiments and the description is not repeated.

In this embodiment, specifically, TMDS (transition minimized differential signaling), which is a digital monitor interface, is used as the interface between an external host device and the display device 1.

In TMDS, a signal supplied from an external host device is divided into 4 channels which are formed of 3 channels (R, G, and B) for a serial image signal and a channel for a clock signal. The signal control circuits 17 have receiving circuits 60 corresponding to these 4 channels of the signal and light-emitting element driving circuits 61 that drive the light-emitting elements 23a in the light-emitting element array 23 according to outputs of the receiving circuits 60. In addition, the signal control circuits 17 have a vertical synchronization signal generating circuits 62 that generate vertical synchronization signals according to outputs from the receiving circuits 60 corresponding to some channels (B and CLK) and light-emitting element driving circuits 63 that drive light-emitting elements 24a in the light-emitting element array 24 according to outputs from the vertical synchronization signal generating circuits 62.

On the other hand, the data electrode driving circuits 15A to 15C have amplifiers 70 to which outputs from the light-receiving elements 26a in the light-receiving element array 26A are supplied, decoding circuits 71 that convert serial data into parallel data and subsequently decode the data, driving circuits 72 that drive the data electrodes according to the decoding results of the decoding circuits 71, and PLL circuits 73 that control phase alignment of the decoding circuits 71 with the driving circuits 72 according to outputs from the amplifiers 70 which receive clock signals.

The light-emitting elements 23a in the light-emitting element array 23 and the light-receiving elements 26a in the light-receiving element array 26A are connected to each other with the same optical waveguide 20A as in the first and second embodiments. The number of bits of the optical waveguide 20A is, however, only 4 bits for R, G, B, and CLK. In addition to the above-described effects of the first and second embodiments, by using the digital monitor interface, a display device that has the structure according to this embodiment can be advantageous in that the number of bits of the optical waveguides 20A to 20C decreases remarkably and image quality is prevented from deteriorating, or the deterioration is reduced, during transmission.

Since, as described above, optical transmission lines are used for the signal transmission lines between the signal control circuits 17 and the data electrode driving circuits, and between the signal control circuits 17 and address electrode driving circuits in the present invention, EMI, skew between the data electrode driving circuits, and skew between the address electrode driving circuits, do not occur, and therefore, the display device is significantly advantageous to increase the size and the resolution thereof.

The invention claimed is:

1. A display device, comprising:
 a display section that includes pixels arrayed at respective intersections of data electrodes and address electrodes disposed in a grid;
 data electrode driving circuits that drive the data electrodes;

address electrode driving circuits that drive the address electrodes;

signal control circuits that generate signals necessary to drive the data electrode driving circuits and the address electrode driving circuits and that supply the signals to the data electrode driving circuits and the address electrode driving circuits; and signal transmission lines that transmit signals between the signal control circuits and the data electrode driving circuits, and between the signal control circuits and the address electrode driving circuits, the signal transmission lines being optical transmission lines capable of transmitting optical signals;

light-emitting elements that convert electrical signals into optical signals being provided between the signal control circuits and the signal transmission lines; and light-receiving elements that convert the optical signals into electrical signals being provided between the signal transmission lines and the data electrode driving circuits, and between the signal transmission lines and the address electrode driving circuits, the optical transmission lines each having mirrors positioned at opposing longitudinal ends to deflect light, entering and leaving the optical transmission lines, in perpendicular directions, and the light-emitting elements being vertically displaced from the light-receiving elements in a thickness direction of a first substrate in which the light-emitting elements and the light-receiving elements are disposed.

2. The display device according to claim 1, the display section, the data electrode driving circuits, the address electrode driving circuits, the signal control circuits, the signal transmission lines, the light-emitting elements, and the light-receiving elements being disposed on a single substrate.

3. The display device according to claim 1, the display section, the data electrode driving circuits, the address electrode driving circuits, and the light-receiving elements being disposed on one surface of a transparent substrate, and the signal control circuits, the signal transmission lines, and the light-emitting elements being disposed on the other surface of the transparent substrate, and optical signals transmitted through the signal transmission lines passing through the transparent substrate from one surface to the other surface thereof and thus entering the light-receiving elements.

4. A method for manufacturing a display device, comprising:

providing a display section that includes pixels arrayed at respective intersections of data electrodes and address electrodes disposed in a grid on one surface of a transparent first substrate;

forming polymer optical waveguides on a second substrate;

disposing, on the polymer optical waveguides, data electrode driving circuits that drive the data electrodes, address electrode driving circuits that drive the address electrodes, a light-receiving element having a signal-output side connected to the signal-input side of the data electrode driving circuits, a light-receiving element having a signal-output side connected to the signal-input side of the address electrode driving circuits, signal control circuits that generate and output signals necessary to drive the data electrode driving circuits and the address electrode driving circuits, and light-emitting elements that convert electrical signals generated by the signal control circuits into optical signals and transmit the optical signals to the polymer optical waveguides;

vertically displacing the light-emitting elements from the light-receiving elements in a thickness direction of a first substrate in which the light-emitting elements and the light-receiving elements are disposed, bonding a third substrate to the second substrate such that the polymer optical waveguides are located therebetween; and then, removing the second substrate from the polymer optical waveguides;

forming, in each polymer optical waveguide, a mirror that sends light emitted by the corresponding light-emitting element to the polymer optical waveguide, and a mirror that sends the light to the corresponding light-receiving element; and subsequently, bonding the third substrate to the other surface of the first substrate such that the polymer optical waveguides are located therebetween.

5. A method for manufacturing a display device, comprising:

providing, on one surface of a transparent first substrate, a display section that includes pixels arrayed at respective intersections of data electrodes and address electrodes disposed in a grid, data electrode driving circuits that drive the data electrodes, address electrode driving circuits that drive the address electrodes, a light-receiving element having a signal-output side connected to the signal-input side of the data electrode driving circuits, and a light-receiving element having a signal-output side connected to the signal-input side of the address electrode driving circuits;

vertically displacing the light-emitting elements from the light-receiving elements in a thickness direction of a first substrate in which the light-emitting elements and the light-receiving elements are disposed;

forming polymer optical waveguides on a second substrate;

forming, in each polymer optical waveguide, a mirror that sends light to the corresponding light-receiving element;

disposing signal control circuits that generate and output signals necessary to drive the data electrode driving circuits and the address electrode driving circuits, light-emitting elements that convert electrical signals generated by the signal control circuits into optical signals and transmit the signals to the polymer optical waveguides;

subsequently, bonding a third substrate to the second substrate such that the polymer optical waveguides are located therebetween; and then, removing the second substrate from the polymer optical waveguides;

forming mirrors that send light emitted by the light-emitting elements to the respective polymer optical waveguides; and bonding the third substrate to the other surface of the first substrate such that the polymer optical waveguides are located therebetween.

* * * * *